US 6,544,135 B2

United States Patent
Witzenberger

(10) Patent No.: US 6,544,135 B2
(45) Date of Patent: Apr. 8, 2003

(54) TRACKED VEHICLE WITH SHIFTABLE LATERAL INTERMEDIATE TRANSMISSION

(75) Inventor: Max Witzenberger, Aindling (DE)

(73) Assignee: Renk Aktiengesellschaft, Augsburg (DE)

( * ) Notice: Subject to any disclaimer, the term of this patent is extended or adjusted under 35 U.S.C. 154(b) by 0 days.

(21) Appl. No.: 09/803,508

(22) Filed: Mar. 9, 2001

(65) Prior Publication Data
US 2001/0024990 A1 Sep. 27, 2001

(30) Foreign Application Priority Data
Mar. 16, 2000 (DE) .......................... 100 12 912

(51) Int. Cl.[7] .............................................. B62D 11/06
(52) U.S. Cl. .............................. 475/18; 475/28; 475/29; 192/219; 180/9.44
(58) Field of Search .................... 475/28, 18, 29, 475/280; 192/219, 219.5; 180/9.1, 9.44, 6.7, 337, 344

(56) References Cited

U.S. PATENT DOCUMENTS

| 2,353,554 A | | 7/1944 | Gates .......................... 475/27 |
| 3,990,528 A | * | 11/1976 | Haak et al. ................. 180/9.62 |
| 4,215,755 A | * | 8/1980 | Waterworth et al. ........... 475/29 |
| 4,240,534 A | | 12/1980 | Hedgcock et al. ......... 192/13 R |
| 4,420,991 A | * | 12/1983 | Meyerle ........................ 475/23 |
| 4,448,092 A | * | 5/1984 | Binger .......................... 74/390 |
| 4,577,714 A | * | 3/1986 | Tokunaga .................... 180/70.1 |
| 4,955,442 A | * | 9/1990 | Crabb et al. ................ 180/6.44 |
| 5,101,919 A | * | 4/1992 | Ossi ............................ 180/6.2 |
| 5,139,465 A | * | 8/1992 | Sato .............................. 475/28 |
| 5,316,381 A | * | 5/1994 | Isaacson et al. ............... 305/10 |
| 5,503,232 A | * | 4/1996 | Matsushita et al. ............ 172/2 |
| 5,997,425 A | * | 12/1999 | Coutant et al. ................ 475/18 |
| 6,318,200 B1 | * | 11/2001 | Coleman et al. ........... 74/421 R |
| 6,336,886 B1 | * | 1/2002 | Ohya et al. .................. 475/23 |

FOREIGN PATENT DOCUMENTS

| DE | 35 23 381 | 1/1987 | |
| EP | 0 207 260 | 1/1987 | |
| GB | 762816 | 12/1956 | |
| JP | 06042607 A | * 2/1994 | .................. 475/18 |

* cited by examiner

Primary Examiner—Jack Lavinder
Assistant Examiner—Mariano Sy
(74) Attorney, Agent, or Firm—Cohen, Pontani, Lieberman & Pavane

(57) ABSTRACT

Tracked vehicle with at least one engine and one gear-change and steering transmission and with lateral intermediate transmissions as final drives for track sprockets on both side of the drive. Each lateral intermediate transmissions is shiftable between at least two gears.

10 Claims, 4 Drawing Sheets

TRACKED VEHICLE WITH SHIFTABLE LATERAL INTERMEDIATE TRANSMISSION

BACKGROUND OF THE INVENTION

1. Field of the Invention

The invention relates to a tracked vehicle with an engine, a pair of track sprockets driven by the engine, a main transmission for transmitting power from the engine to the track sprockets, the main transmission having at least two gears and being used for steering, and a pair of lateral intermediate transmissions between the main transmission and the track sprockets.

2. Description of the Related Art

The practice of fitting tracked vehicles with automatic main transmission and lateral intermediate transmissions on both sides of the drive that adapt the rotational speeds to the track sprockets is well known. On certain tracked vehicles with conventional main transmissions, which can be operated both in normal driving mode at high speed and in a special working mode at low speed, the transmission wears rapidly because the start-up gears selected for the working speeds are not designed for continuous operation.

SUMMARY OF THE INVENTION

Given this situation, it is the object of the invention to create a tracked vehicle that is fitted with a conventional main transmission and can be used both for low working speeds and for normal driving speeds while avoiding excessive wear of the main transmission.

According to the invention, each lateral intermediate transmission has at least two gears and a final drive between the at least two gears and the respective track sprocket.

By virtue of the arrangement according to the invention, it is possible in an advantageous manner to provide tracked vehicles that are to be operated both at low working speeds and at normal driving speeds, e.g. 70 km/h, with conventional main transmissions for steering and gear changing such as those which are supplied as standard by manufacturers of transmissions. As a result, it is possible to equip and operate such tracked vehicles economically since there is no need either for expensive special designs for a specific main transmission or for frequent expensive replacement of worn-out transmissions.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
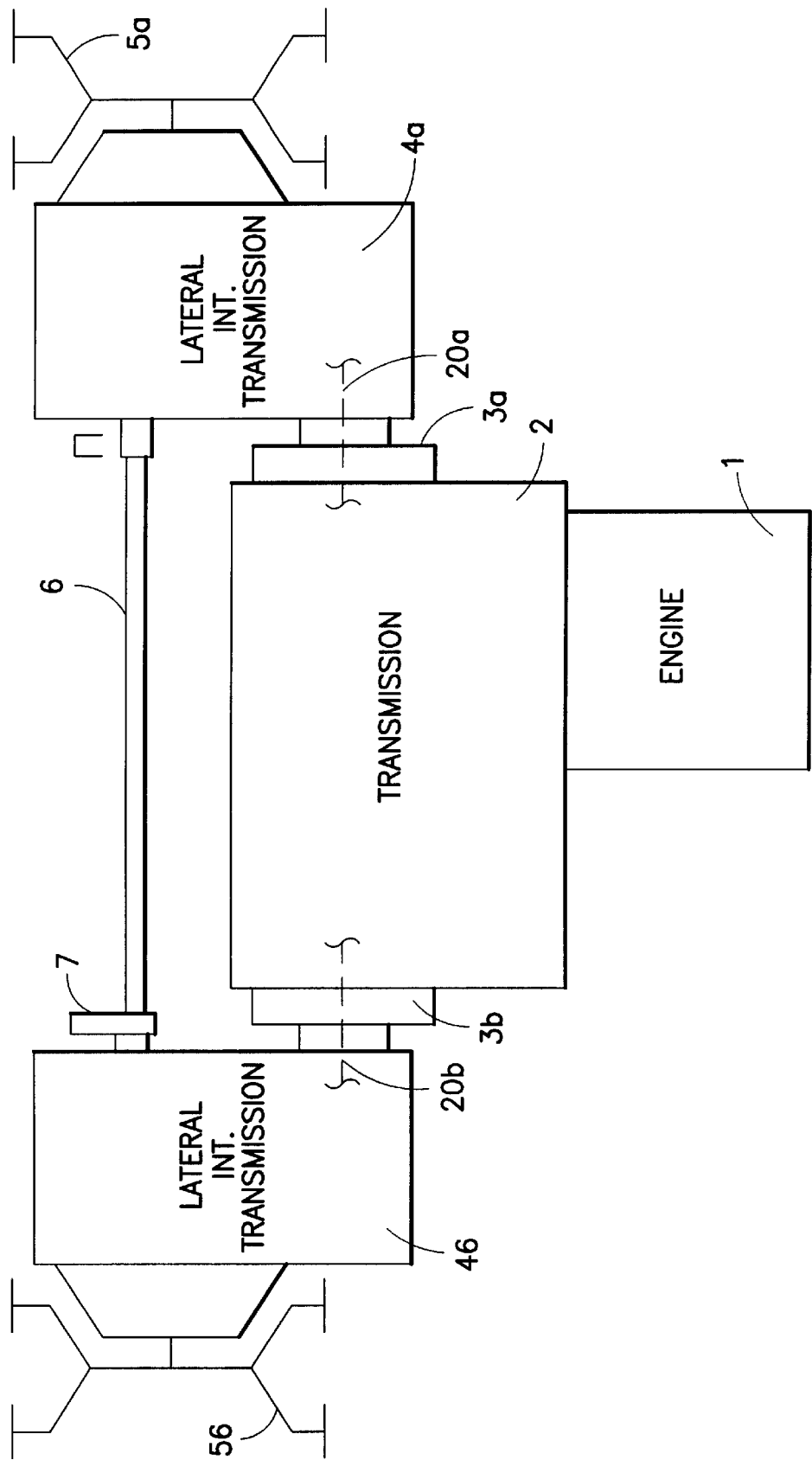
FIG. 1 shows a schematic block diagram of the drive components.

The block diagram in FIG. 1 gives a schematic illustration of an arrangement of the drive components of a tracked vehicle, this arrangement being generally customary. There is an engine (1) that outputs the driving power to a transmission (2), which adapts the engine speeds to the desired speeds of travel. As is customary with tracked vehicles, this transmission (2) is also used to steer the vehicle. On the transmission (2) there are brakes (3a, 3b) for both sides of the drive (a, b) and these both act as service brakes and can be used for steering in emergencies.

The brakable input shafts (20a, b) via which the driving power is transmitted to the lateral intermediate transmissions (4a, b) are indicated in broken lines. In the lateral intermediate transmissions (4a, b), the rotational speeds are adapted to the track sprockets (5a, b) and, from there, are ultimately transmitted to the driving tracks (not shown). In this symbolic arrangement, an embodiment with track sprockets (5a, 5b) offset axially relative to the input shafts (20a, 20b) of the transmission (2) is shown. It would of course also be possible to arrange the track sprockets coaxially with the output shafts.

The components provided for each side of the drive are of essentially identical construction and are arranged symmetrically with respect to one another.

The transmission (2) is preferably a commercially available automatic transmission that can change between a number of start-up gears and a number of travel gears. For machines or other equipment that is to be operated on the tracked vehicle, it is also possible to provide a power take-off on the transmission (2).

The drive arrangement under consideration is preferably provided for tracked vehicles fitted with implements such as buckets for loading or grabbing or with equipment for levelling and must therefore be driven at very low working speeds but should also allow normal speeds of travel (e.g. 70 km/h) for transfer between locations of use, for example.

If conventional transmissions (2) were used, these would have to be operated in the start-up gears for the working speeds, but these are not designed for continuous operation of this kind and are therefore subject to excessive wear. To avoid this and to enable the transmission (2) to be used for a long time in a tracked vehicle that is used in this way, the lateral intermediate transmissions (4a, b) are, according to the invention, fitted with a further reduction stage, by means of which the rotational speeds of the normal travel gears can be adapted to the lower rotational speeds for the working speeds. To allow the switch between the two reduction stages, the lateral intermediate transmissions (4a, b) are provided with selecting devices, which are preferably coupled to one another mechanically by a selector linkage (6) having a selector lever (7) to ensure that both sides of the drive are always changed to the same gear.

Electric or hydraulic couplings with multiple safety devices would also be conceivable.

When changing between the ratios of the lateral intermediate transmissions (4a, 4b), it is possible for a gear-change (neutral) position between the gears to occur in which the track sprockets (5a, b) are completely decoupled from the transmission (2) and also from the service brakes (3a, b). If such a situation were to occur in an unsecured state, e.g. while the vehicle was travelling or standing on a slope, it would not be possible either to brake or steer this tracked vehicle.

To avoid dangerous situations of this kind, the shiftable lateral intermediate transmissions (4a, b) have been fitted with safety devices that allow gear-change operations only in controllable driving states.

Figure 2A:
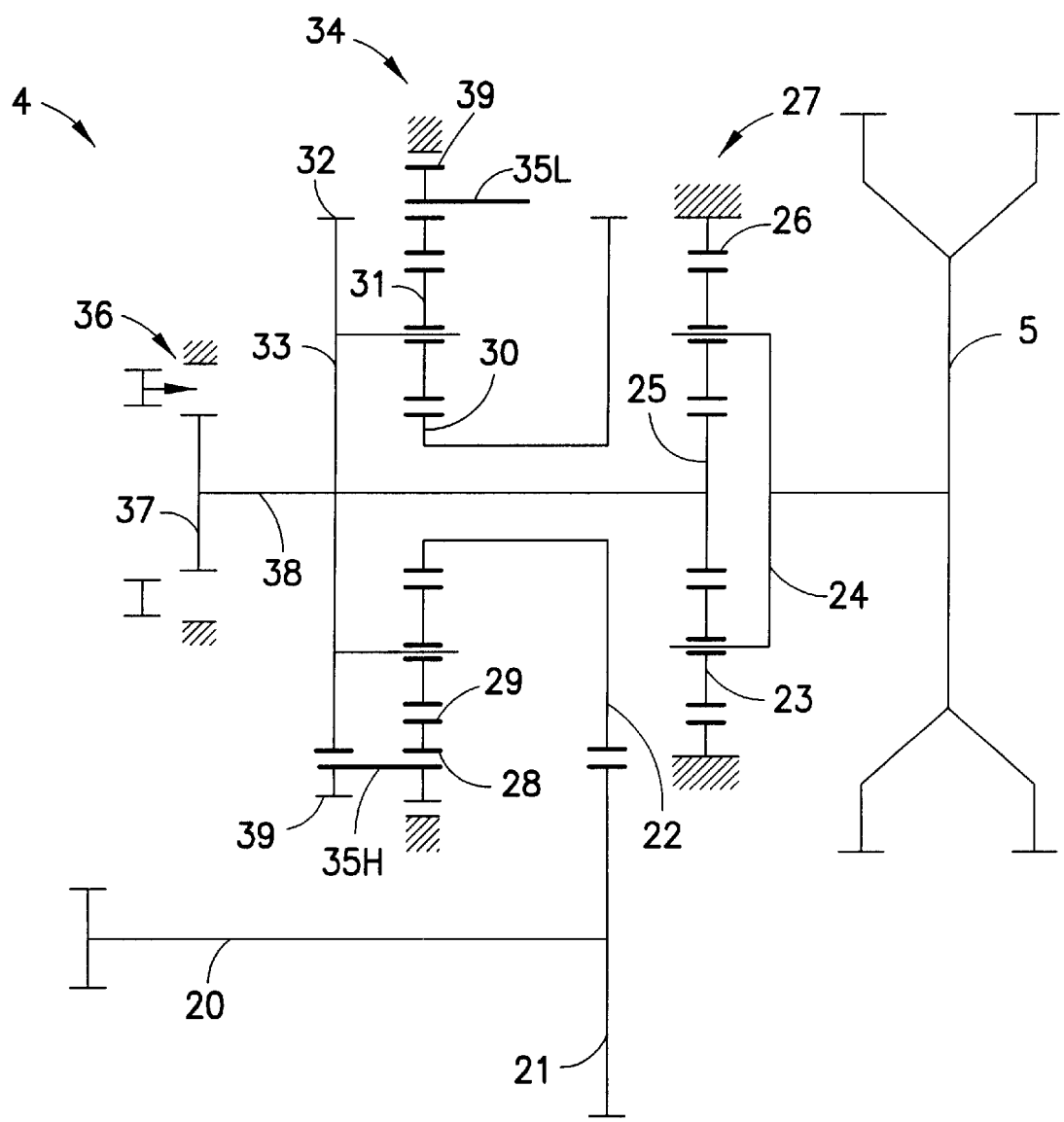
FIG. 2a shows the flow of power in a first embodiment of lateral intermediate transmission wherein the input shaft is offset from the output shaft.

FIG. 2a shows an illustrative flow of power in a lateral intermediate transmission (4) with an axially offset input and output shaft. The counterpart on the other side of the drive is of identical construction but the elements are arranged in mirror symmetry (about the longitudinal axis of the vehicle).

The driving power is introduced into the lateral intermediate transmission (4) via an input shaft (20), on which an input clutch is arranged at the transmission and a spur gear (21) is arranged towards the intermediate transmission. The brake (3) acting on this shaft (20) is not shown. This spur gear (21) meshes with another spur gear (22), which is arranged on a hollow shaft together with a sun gear (30). The sun gear (30) interacts with the planet gears (31) of an epicyclic transmission (34), the annulus (29) of which has external teeth (28), at which it can be connected in a rotationally fixed manner to the housing by a selector element (35) in a first selector position (35L). This selector element (35) is preferably a displaceable cylindrical gear coupling, the internal teeth of which mesh with the external teeth (28) of the annulus (29) in every position into which the selector is moved. In selector position (35L) the selector additionally meshes with teeth on the housing by means of its external teeth (39), thereby fixing the annulus (29) of the epicyclic transmission (34) relative to the housing. In this selector position (35L), the planet gears (31) revolve within the annulus (29) and output the reduced rotational speed via the planet carrier (33), which is connected to an output shaft (38).

In this embodiment, there is a further epicyclic transmission as a final drive (27) on this output shaft (38), towards the tracks. This fixed stage is driven via a sun gear (25) arranged on the output shaft (38). The planet gears (23) revolve in the annulus (26), which is fixed relative to the housing, and transmit power via the planet carrier (24) into the track sprocket (5), which carries the driving track.

In another selector position (35H) of the selector element (35), the epicyclic transmission (34) is locked or used as a direct gear. This is accomplished by displacing the selector element (35) in the direction of the planet carrier (33), the internal teeth of the selector element (35) remaining in engagement with the external teeth (28) of the annulus (29) but the locking of the selector element (35) to the housing being cancelled, allowing the annulus (29) to be rotated relative to the housing. If the selector element (35) is pushed further out of a neutral state, in which the output shaft (38) is secured only by the parking interlock (36), the internal teeth of the selector element (35) come into engagement with spur teeth (32) on the planet carrier (33), thereby locking the annulus (29) to the planet carrier (33). In this selector position (35H), the selector element (35) revolves together with all the elements of the epicyclic transmission (34), and the rotational speed of the sun gear (30) is introduced into the output shaft (38) without an increase or reduction. From the output shaft (38) the flow of power is as already described above.

In other embodiments, the output shaft (38) can also be directly connected to the track sprocket (5).

Figure 3:
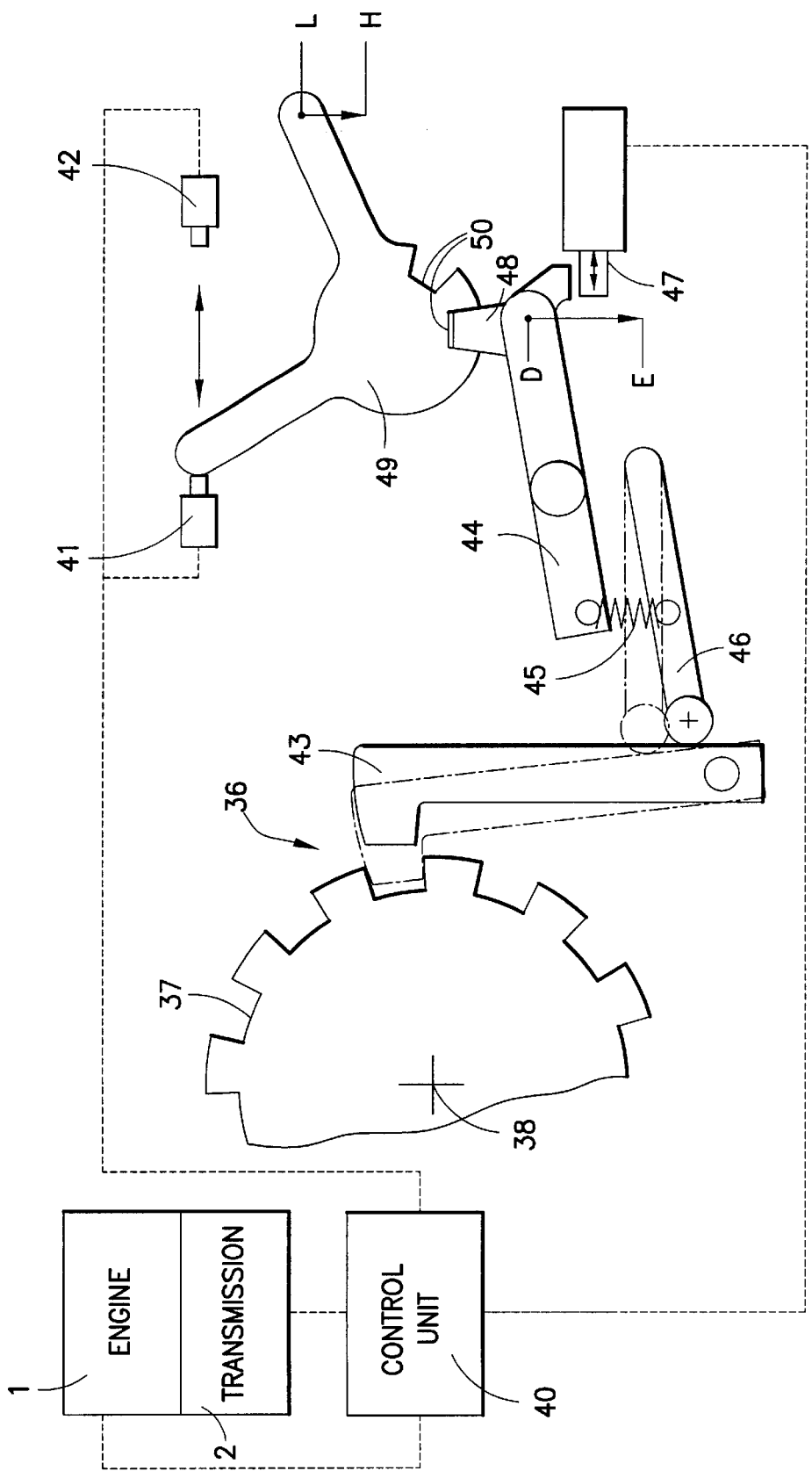
FIG. 3 shows an illustrative principle of operation including a block diagram of the safety devices.

Arranged at the other end of the output shaft (38), away from the final drive (27), on the same side as the planet carrier (33), is a gear with jaws (37), which interacts with the functional unit of a parking interlock (36) and can lock the track sprocket (5) when the vehicle is stationary or bring it to a halt at low speed (below about 3 km/h). The precise functional relationships are illustrated by FIG. 3.

Figure 2B:
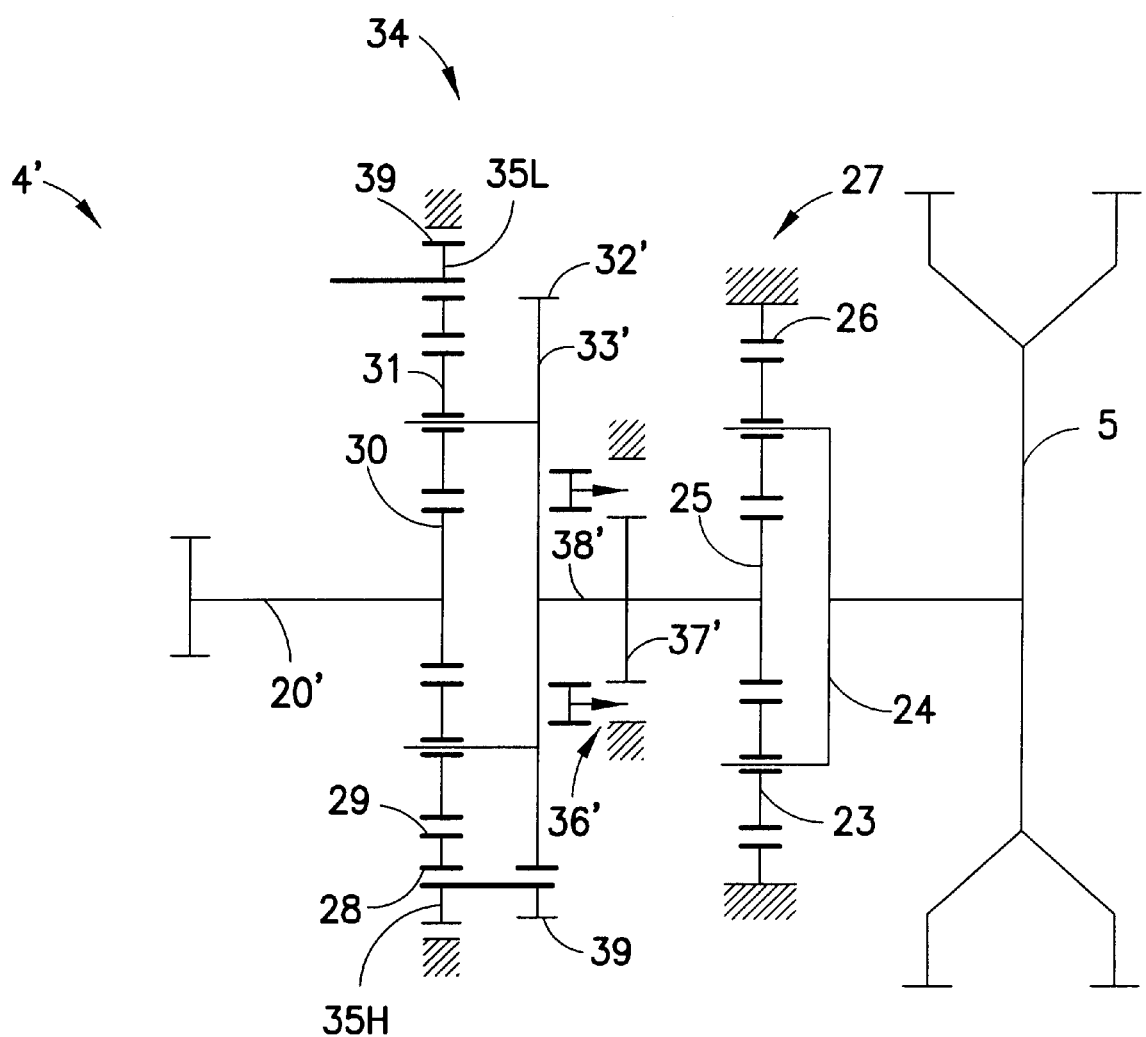
FIG. 2b shows the flow of power in a second embodiment of lateral intermediate transmission wherein the input shaft is coaxial with the output shaft.

FIG. 2b shows an embodiment with a coaxial lateral intermediate transmission (4'). The output shaft of the transmission (2)—cf. FIG. 1—is extended coaxially with the input shaft (20') and transmits power to the epicyclic transmission (34) by means of the sun gear (30) without a spur gear set. From the sun gear (30) the flow of power and the selector positions (35H, 35L) are similar to those in FIG. 2a, although a number of components are installed in a slightly different way. In this embodiment, the planet carrier (33') is arranged on the same side of the epicyclic transmission (34) as the track sprocket (5) and the selector element (35) is pushed over the external teeth (28) and the spur teeth (32') in the opposite direction of installation, although it operates in the same way. The output shaft (38') furthermore carries the gear with jaws (37') of the parking interlock (36') between the planet carrier (33') and the track sprocket (5). In terms of its operation, the parking interlock (36') is identical with the one shown in FIG. 2a. The output shaft (38') can be connected to the track sprocket (5) either directly or via a final drive (27).

In FIGS. 2a and 2b, the selector element (35) is shown in both selector positions (35L, 35H), the selector position (35L) for the low gear being shown above the centre line of the epicyclic transmission (34), and the selector position (35H) for the high gear being shown below the centre line.

In all the embodiments, conventional selection devices and other levers (some of which are not shown specifically) are used for the selecting operations.

FIG. 3 shows a block diagram of the drive elements and a functional diagram of the mechanical safety devices, which are provided equally on both lateral intermediate transmissions (4a, b). A control unit (40) is associated with the engine (1) and the main transmission (2) shown in FIG. 1. Also illustrated is the gear with jaws (37, 37') already shown in FIG. 2, which is arranged on the output shaft (38, 38') and belongs to the parking interlock (36). The parking interlock (36) illustrated by way of example for the various embodiments (FIG. 2a and 2b) comprises an actuating lever (44), which is locked against actuation at one end by a parking catch (47) to prevent the parking interlock (36) being engaged while the vehicle is in motion. Triggered by the control unit (40), the parking catch (47) allows actuation as soon as the speed of travel of the vehicle is below about 3 km/h since the engagement of the locking lever (43) on the gear with jaws (37) is assured in this range and there is no risk of destroying the parking interlock (36).

When one arm of the actuating lever (44) is moved from position D to position E, the other arm of the lever rises and pulls an interlock lever (46) into a horizontal position by means of a tension spring (45), as a result of which the locking lever (43) is moved up against the gear with jaws (37) and, when it runs over a jaw, engages. Disengagement is prevented by the interlock lever (46), which is placed horizontally against the locking lever (43). To release the parking interlock (36), the interlock lever (46) must be pressed down again. Selector position D corresponds to the disengaged position and selector position E to the engaged position of the parking interlock (36).

Other principles of operation are also possible.

When the parking interlock (36) is disengaged, the actuating lever (44) locks a selector lever (49) by means of a latch (48) that engages in a jaw (50). This selector lever (49) symbolizes the device for changing gear in the lateral intermediate transmission (4a, 4b). The illustrated selector-lever position L represents the low gear and, when moved into the other selector-lever position H, this selector lever (49) sets devices associated with it in motion in such a way that the selector element (35, FIG. 2) is moved into the corresponding selector position (35H). The situation is identical when changing to the high gear, a jaw (50) being provided on the selector lever (49) in each position (L, H) to block actuation.

In each selector position, the selector lever (49) triggers sensors (41, 42), which are connected to the control unit (40). The control unit (40) then chooses a predetermined gear-change program for the main transmission (2, FIG. 1) in accordance with the respectively selected gear in the intermediate transmission. With the low gear engaged, for example, changing between the start-up gears is dispensed with.

The selector levers (49) of the two lateral intermediate transmissions (4a, 4b) are preferably coupled to one another mechanically by means of a selector linkage (6, FIG. 1) to ensure that the same gears are always selected on both sides of the drive. Redundant electric or hydraulic couplings with multiple safety devices are also possible, however.

The devices illustrated and explained in FIG. 3 are present in identical form on both sides of the drive and in all exemplary embodiments in accordance with FIG. 2.

The parking interlock (36) could also be arranged directly on the track sprocket (5) or on the planet carrier (24), it being possible to take off significantly higher torques at this position in the flow of power, in which case a parking interlock (36) of correspondingly larger dimensions would have to be provided.

For other applications, it would also be possible to provide lateral intermediate transmissions with more than two gear ratios.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A tracked vehicle comprising:

an engine, a pair of track sprockets driven by said engine, a main transmission for transmitting power from said engine to respective said track sprockets, said main transmission having at least two gears and also being used for steering, a pair of lateral intermediate transmissions between the main transmission and respective said track sprockets, each said intermediate transmission comprising an input shaft via which power is transmitted from said main transmission, and at least two gears between said input shaft and a final drive to the respective said track sprocket, and means for shifting gears in each said intermediate transmission.

2. A tracked vehicle according to claim 1 wherein each said intermediate transmission further comprises a parking interlock which is engageable to the final drive and prevents movement of the track sprocket when engaged, said means for shifting said gears in each said intermediate transmission enabling shifting only when said parking interlock engages said final drive and when the other intermediate transmission is being shifted to the same gear.

3. A tracked vehicle according to claim 2 wherein said means for shifting gears comprises:

a selector lever for selecting one of said gears, said selector lever having a pair of jaws, a latch which engages one of said jaws to prevent moving said lever when one of said gears is selected and said parking interlock is not engaged, and selector linkage which connects said selector lever to the selector lever of the other intermediate transmission so that said selector levers can only be moved simultaneously.

4. A tracked vehicle according to claim 2 wherein each said intermediate transmission further comprises:

a parking catch which, when actuated, permits said parking interlock to engage said final drive so that said gears in the intermediate transmission can be shifted, and a control unit which actuates said parking catch when said vehicle is traveling below a predetermined speed.

5. A tracked vehicle according to claim 3 wherein each intermediate transmission comprises:

a parking catch which, when actuated, permits said parking interlock to engage said final drive so that gears in the intermediate transmission can be shifted, and an actuating lever which, when the parking catch is released, is pivotable to a position where said parking interlock can be engaged to said final drive, said parking interlock comprising a locking lever which is engageable to said final drive to prevent movement of said track sprocket, an interlock lever which is moveable against locking lever to move said locking lever from a disengaged position to an engaged position, and a tension spring connecting said actuating lever to said interlock lever, said final drive comprising a gear having a plurality of jaws, said gear being fixed to an output shaft, said jaws being engageable by said locking lever.

6. A tracked vehicle as in claim 1 further comprising:

a selector lever for changing gears in each said intermediate transmission, sensors for detecting the gear selected in each of the intermediate transmissions, and a control unit which chooses a predetermined gear-change program for the main transmission based on the gear selected in each of the intermediate transmissions.

7. A tracked vehicle according to claim 1 wherein each said lateral intermediate transmission comprises:

a spur gear fixed to said input shaft, a hollow shaft having fixed thereto a spur gear which is driven by said spur gear on said input shaft, a selector element which is moveable between a first selector position and a second selector position, an epicyclic transmission comprising a sun gear fixed to said hollow shaft, a planet carrier fixed to an output shaft and carrying a plurality of planet gears, and an annulus in which said planet gears revolve when said selector element is in said first selector position, and a housing to which said annulus is rotationally fixed when said selector element is in said first selector position, wherein said output shaft rotates at a reduced speed with respect to said sun gear, and from which said annulus is released when said selector element is in said second selector position, wherein said sun gear is rotationally fixed with respect to said output shaft.

8. A tracked vehicle according to claim 7 wherein said input shaft is coaxial to said sun gear and said output shaft.

9. A tracked vehicle according to claim 7 wherein said final drive connects the output shaft to the track sprocket, said final drive comprising a sun gear fixed to the output shaft, a planet carrier carrying a plurality of planet gears which mesh with said sun gear, and an annulus in which said planet gears revolve, said annulus being fixed to said housing.

10. A tracked vehicle as in claim 7 wherein the output shaft can be connected directly to the track sprocket.

* * * * *